United States Patent Office 3,436,427
Patented Apr. 1, 1969

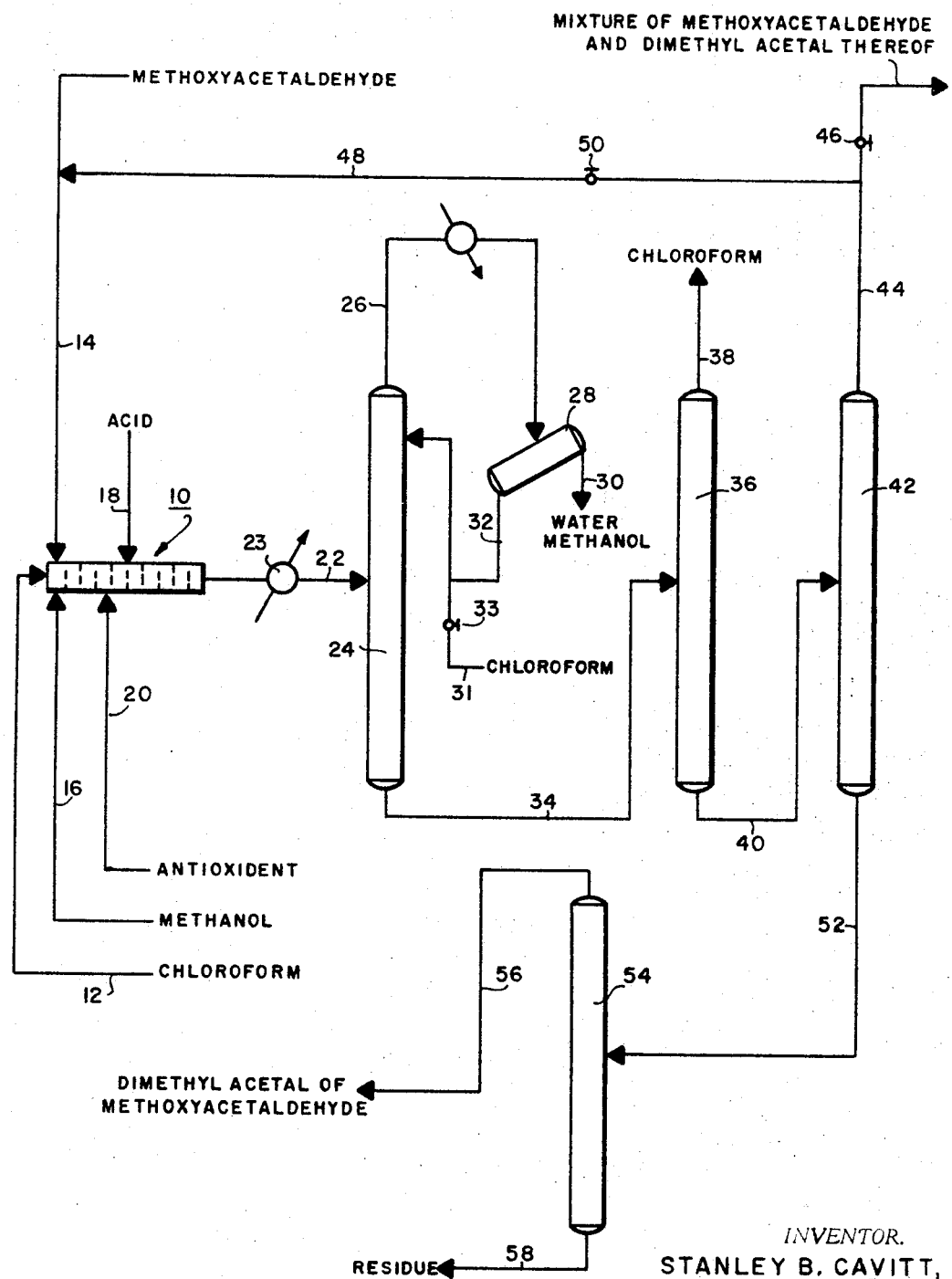

3,436,427
PREPARATION OF METHOXYACETALDEHYDE DIALKYLACETALS
Stanley B. Cavitt, Austin, Tex., assignor to Jefferson Chemical Company, Inc., Houston, Tex., a corporation of Delaware
Filed Nov. 28, 1966, Ser. No. 597,295
Int. Cl. C07c 41/10, 43/30
U.S. Cl. 260—615    2 Claims

ABSTRACT OF THE DISCLOSURE

High yields of methoxyacetaldehyde dialkylacetals are obtained when the methoxyacetaldehyde is reacted with a lower alkyl alcohol under acetal reaction conditions in the presence of a chloroform azeotroping agent.

---

This invention relates to a method for the preparation of methoxyacetaldehyde dialkylacetals. More particularly, this invention relates to a method for the preparation of the dialkylacetals from methoxyacetaldehyde contaminated with water.

It has heretofore been proposed to prepare methoxyacetaldehyde by the oxidation of monomethyl glycol ether in the presence of a silver catalyst. Water is a by-product.

In accordance with the present invention, it has been discovered that methoxyacetaldehyde dialkylacetals, such as methoxyacetaldehyde dimethylacetal (1,1,2-trimethoxyethane), can be prepared by contacting aqueous methoxyacetaldehyde with a lower alkanol in chloroform solution under acidic conditions. Preferably, the reaction is conducted continuously at atmospheric pressure in a conventional distillation column provided with a reflux condenser having a tap for the removal of water, whereby reaction and partial purification of the reaction product are simultaneously accomplished.

Although any of the lower alkanols, such as methanol, ethanol, propanol, isopropanol, butanol, isobutyl alcohol, tertiary butyl alcohol, etc., and mixtures thereof, may be employed, methanol is preferably used. It is the alcohol of choice in those situations wherein the aqueous methoxyacetaldehyde feedstock also contains methanol, as is the case when the feedstock is a partially purified product obtained by the oxidation of ethylene glycol monomethyl ether.

Although the reaction proceeds under ambient conditions, it is preferably conducted at a temperature of about 50° to 100° C., such as the reflux boiling point of the chloroform solution.

In order to minimize side reactions, such as polymer formation, alcohol is normally employed in excess of the amount required for the reaction. (Thus, charge ratios of about 1 to 10 mols of alcohol are preferably employed, although greater or lesser amounts such as 0.2 to 20 mols of alcohol per mol of methoxyacetaldehyde can be used if desired.)

The methoxyacetaldehyde dialkylacetals are useful as solvents and as intermediates in the preparation of unsaturated ethers.

Chloroform is employed in an amount to provide a solution of about 25% to 75% of chloroform in methoxyacetaldehyde.

The invention will be further illustrated in connection with the attached drawing, which is a schematic flow sheet illustrating a preferred embodiment of the invention. In order to simplify the drawing, conventional details such as valves, pumps, condensers, reboilers, flow and temperature control devices, etc., have not been shown since the construction, operation and function thereof is known to those of ordinary skill in the art.

Turning now to the drawing, methoxyacetaldehyde and a suitable alcohol, such as methanol, are dissolved in chloroform in any suitable manner. For example, a baffle plate incorporator 10 may be employed to which chloroform is added by line 12, methoxyacetaldehyde by line 14 and methanol by line 16 in any desired proportions. A minor amount of an acid, such as hydrochloric acid, p-toluenesulfonic acid, sulfuric acid, boron trifluoride, etc., is added by a line 18 and an oxidation inhibitor such as hydroquinone, resorcinol, ditertiarybutyl-paracresol or hydroquinone monomethyl ether is added by a line 20.

The resultant mixture is passed from baffle plate incorporator 10 by a line 22 containing a preheater 23 to a columnar reactor equipped with a reflux condenser and internal fractionating means, such as a conventional packed or bubble plate distillation column 24.

A distillate fraction 26 is taken overhead comprising chloroform, unreacted methanol and water which is condensed and charged to a phase separation zone 28 from which water and methanol are discharged by a line 30. The chloroform layer is preferably returned to the column 24 as reflux by a line 32. Additional chloroform may be added, if necessary or desirable, by line 31 controlled by valve 33.

The bottoms fraction 34 from reactor 24 is suitably charged to a distillation column 36 where chloroform is removed as a distillate fraction 38 for recycle to the chloroform charge line 12, if desired. The bottoms 40 from the column 36 are charged to a second column 42 wherein unreacted methoxyacetaldehyde and methoxyacetaldehyde dimethylacetal are removed as distillate by a line 44 controlled by a valve 46. All or a part of the fraction 44 may be recycled to the charge line 14 by way of a branch line 48 controlled by a valve 50. However, if substantially anhydrous methoxyacetaldehyde is desired, all or a part of the fraction 44 may be charged to a distillation column (not shown) for separation of a portion of the methoxyacetaldehyde as an anhydrous distillate, after which the remainder may be recycled to the line 14.

The bottoms 52 from the column 42 are charged to a third distillation column 54 wherein purified methoxyacetaldehyde dimethylacetal is recovered by a line 56; residue being discarded from the system by a line 58.

The invention will be further illustrated by the following examples, which are given by way of illustration and not as limitations on the scope of this invention. Where parts are mentioned, they are parts by weight.

EXAMPLE I

Reactor operation

Pellets of a silica-supported, copper-promoted silver catalyst containing about 25 wt. percent of silver were diluted with an equal volume of inert material (Alundum) and used to fill a bundle of 1-inch, stainless steel tubes immersed in a liquid heat-transfer medium comprising a mixture of diphenyl and polyphenyl oxides. The reactor was brought to a temperature of about 300° to 350° C. with the heat transfer medium and nitrogen was thereafter fed to the reactors. After nitrogen flow had been established, unheated monomethyl glycol ether was pumped through the system until a liquid effluent was obtained and thereafter air to the unit was begun, the air bleed to the nitrogen feed being such that the mixture contained about 4% of oxygen. The maximum temperature recorded in the catalyst tubes was from about 400° to about 450° C.

The oxygen flow rate with respect to monomethyl glycol ether flow rate was within the range of about 0.5 to about 0.6 mol of oxygen per mol of glycol ethers.

Under the above-described reaction conditions, yields and conversions of methoxyacetaldehyde of 83% and 72%, respectively, were obtained. These results were obtained with no pretreatment of the catalyst, and there was no observable deterioration of the catalyst or loss of activity of the catalyst over a period of more than 1,000 hours of use.

The crude effluent from a single pass through the methoxyacetaldehyde reactor consisted typically of 40% to 50% methoxyacetaldehyde, 35% to 45% unreacted methyl glycol ether, 10% to 15% water, 2% to 4% methanol and traces of formaldehyde. Continuous distillation produces a colorless product containing 79% to 80% methoxyacetaldehyde, 12% to 15% water and 3% to 5% methanol.

EXAMPLE II

Simultaneous purification and reaction of methoxyacetaldehyde with methanol

The following example illustrates the procedure that may also be used to prepare an anhydrous solution of methoxyacetaldehyde in an organic solvent which is suitable for use in a reaction requiring anhydrous conditions.

To a 3,000 ml. flask equipped with a thermometer, stirrer, distillation column and azeotroping head were added 1,000 grams of 79% aqueous methoxyacetaldehyde, 500 grams of chloroform, 1.0 gram of p-toluenesulfonic acid hydrate, 1.0 gram of Cyanamid C-2246 antioxidant and 500 grams of methanol. The mixture was heated to reflux and the water layer was continously removed with return of the lower layer. After a homogeneous distillate was being obtained and no further water azeotrope was being collected, the contents of the distillation flask were cooled and placed in another flask attached to a standard distillation column. The mixture was distilled at atmospheric pressure to give a forerun consisting primarily of chloroform, then 174 grams of a mixture of methoxyacetaldehyde and its dimethylacetal, and finally 313 grams of methoxyacetaldehyde dimethylacetal, B.P. 123–6° C./760 mm. The residue amounted to 483 grams and appeared to be primarily methoxyacetaldehyde polymers. The excessive residue was probably caused by prolonged heating in the presence of a strong acid. Total yield of acetal was 384 grams.

Equivalent results are obtained when ethanol or butanol is substituted for the methanol and the example is repeated. However, the products are methoxyacetaldehyde diethylacetal and dibutylacetal, respectively.

Having thus described the invention, what is claimed is:

1. A method for the simultaneous preparation and purification of methoxyacetaldehyde dimethylacetal from methoxyacetaldehyde contaminated with water and methanol which comprises the steps of reacting said methanol with methoxyacetaldehyde under acid conditions in the presence of chloroform at at least the boiling point of the reaction mixture to obtain a distillate containing methanol, chloroform and water, and a liquid bottoms fraction; fractionating said liquid bottoms to obtain a chloroform fraction and a product fraction consisting essentially of methoxyacetaldehyde dimethylacetal.

2. A method for the simultaneous preparation and purification of methoxyacetaldehyde dimethylacetal from methanol and methoxyacetaldehyde contaminated with water which comprises the steps of reacting said methanol with methoxyacetaldehyde under acid conditions in the presence of chloroform at at least the boling point of the reaction mixture to obtain a liquid bottoms fraction and a distillate, said distillate comprising methanol, chloroform and water, said liquid bottoms comprising chloroform, methoxyacetaldehyde and the dimethylacetal thereof, separating said distillate into an aqueous methanol phase and a chloroform phase, recycling said chloroform phase as reflux, fractionating said liquid bottoms into a light distillate chloroform fraction, an intermediate distillate fraction comprising methoxyacetaldehyde, a product fraction consisting of methoxyacetaldehyde dimethylacetal and a residue fraction, recycling said distillate chloroform fraction and recovering substantially anhydrous methoxyacetaldehyde from said intermediate fraction.

References Cited

UNITED STATES PATENTS

| | | |
|---|---|---|
| 2,449,470 | 9/1948 | Gresham et al. |
| 2,678,950 | 5/1954 | Myers et al. _____ 260—616 XR |
| 2,800,513 | 7/1957 | Hall et al. |

FOREIGN PATENTS

| | | |
|---|---|---|
| 147,461 | 7/1952 | Australia. |

LEON ZITVER, *Primary Examiner.*

HOWARD T. MARS, *Assistant Examiner.*